No. 614,283. Patented Nov. 15, 1898.
J. F. BARNETT, Jr.
BICYCLE WHEEL.
(Application filed Oct. 27, 1897.)
(No Model.)
Fig.1
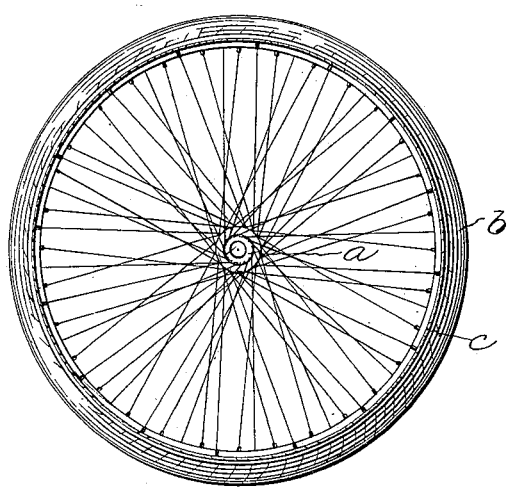
Fig.2
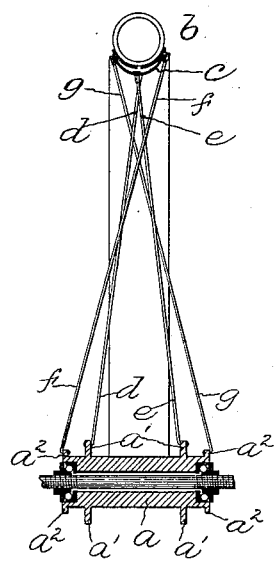
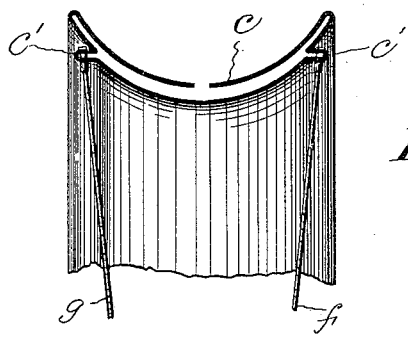
Fig.3
Witnesses
W. E. Campbell
Florence M. Bragg
Inventor
John F. Barnett Jr
By W. E. Simonds
Attorney

UNITED STATES PATENT OFFICE.

JOHN F. BARNETT, JR., OF HARTFORD, CONNECTICUT, ASSIGNOR TO ROBERT A. BARNETT, OF SUFFIELD, CONNECTICUT.

BICYCLE-WHEEL.

SPECIFICATION forming part of Letters Patent No. 614,283, dated November 15, 1898.

Application filed October 27, 1897. Serial No. 656,537. (No model.)

*To all whom it may concern:*

Be it known that I, JOHN F. BARNETT, Jr., a citizen of the United States of America, residing in Hartford, in the county of Hartford and State of Connecticut, have invented certain new and useful Improvements in Bicycle-Wheels, of which the following is a description, reference being had to the accompanying drawings, wherein—

Figure 1 is a side view of a bicycle-wheel embodying said improvements. Fig. 2 is a view on a scale somewhat enlarged as compared with Fig. 1, cutting the hub, tire, and tire-socket in radial cross-section. Fig. 3 is a view on an enlarged scale as compared with the other figures, cutting the rim or tire-socket in cross-section.

The object of the improvement is the production of a bicycle-wheel of great strength and durability.

In the accompanying drawings the letter $a$ denotes the hub of the wheel, $b$ the rubber tire, and $c$ the tire-socket or rim. There are two sets of bracing-spokes $d$ and $e$, one set the complement of the other, which run from the hub to the tire-socket. The hub has wide collars or flanges $a'$ for the attachment thereto of these two sets of bracing-spokes just mentioned. There are two other sets of bracing-spokes $f$ and $g$, one set the complement of the other set, which also run from the hub to the tire-socket or rim. They are attached to the hub outside of the attachment thereto of the spokes $d$ and $e$, and they are also attached to the rim or tire-socket outside of the attachment thereto of the said spokes $d$ and $e$. Between the hub and the tire-socket the spokes $f$ and $g$ cross each other. The hub is provided with narrow collars $a^2$ for the attachment thereto of the spokes $f$ and $g$ at points nearer the axis than the points of attachment of the other set of spokes.

The tire-socket or rim is made of sheet metal, preferably sheet-steel, of a crescent shape, as well illustrated in Fig. 3. Of this same sheet-steel there are formed near the edges of the rim outwardly-projecting leaves $c'$ for the attachment thereto of the spokes $f$ and $g$ at points more remote from the axis than the points of attachment of the spokes $d$ and $e$.

By this construction it will be observed that the crossed spokes are considerably longer than the others. Each of the former extends from a point nearer the axial line of the hub to a point on the rim more remote from the center, while each of the inner spokes extends from a wider collar $a'$ on the hub to the center of the crescent-shaped rim. The crossed spokes are longer not only for this reason, but also because their inner ends stand farther apart than the inner ends of the spokes $d$ and $e$, and their outer ends are also separated, while the corresponding ends of the spokes $d$ and $e$ meet at the central line and their bodies cross each other, while those of the inner spokes do not.

I am aware that heretofore a traction-wheel has been made wherein the outer spokes were longer by reason of their crossing each other, but the outer ends of all the spokes were connected with the rim on a line parallel with the axis and the inner ends of all the spokes were about equally distant from the center of the rim. By the construction employed in my device an additional and considerable difference in length between the two sets of spokes is secured, and it is well known in this art that the strongest wheel is that which is not only braced against strain in the greatest number of ways and that wherein its spokes are tangential, but also that possessing two sets of spokes which differ materially in their length. These spokes are of steel wire and are subjected to variations in their length not only on account of changes in temperature, but also from sudden or excessive strains, and the best known means for overcoming distortion of the wheel by reason of such changes is to employ two sets of spokes which differ as greatly as possible in their extreme length. Furthermore, it is well-known that a bicycle-wheel is subjected to oblique strains on its rim, which are not present in any device having two wheels side by side, and which, hence, necessarily always stand parallel, and I consider the provision of the outer set of spokes herein especially efficacious in overcoming the strain that is thrown on the bicycle-wheel in turning sharp corners.

It will be readily understood that by means of this construction just described a bicycle-wheel is produced of very great strength and durability.

I claim as my improvement—

1. In a wheel, the combination with the hub, and the tire-socket or crescent-shaped rim composed of sheet metal with outwardly-projecting leaves at its sides more remote from the hub than is the transverse center of the rim; of two sets of bracing-spokes which run from two points in the length of the hub to the center of said rim, and two sets of bracing-spokes which cross each other, are attached to said leaves of the rim axially outside the points of attachment of the two sets of spokes first mentioned, and are attached at two other points in the length of the hub.

2. The combination with the crescent-shaped rim having outwardly-projecting leaves at its sides, and the hub having narrow collars around its ends and wider collars around its body nearer its longitudinal center; of two sets of spokes connecting the inner collars with the center of the rim, and two sets of spokes crossing each other and connecting the outer collars with the leaves at the sides of the rim.

JOHN F. BARNETT, JR.

Witnesses:
W. E. SIMONDS,
W. E. CAMPBELL.